United States Patent
Chen et al.

(10) Patent No.: US 7,346,734 B2
(45) Date of Patent: Mar. 18, 2008

(54) CLUSTER STORAGE COLLECTION BASED DATA MANAGEMENT

(75) Inventors: Wei Chen, Beijing (CN); Qiao Lian, Beijing (CN); Zheng Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 336 days.

(21) Appl. No.: 11/137,754

(22) Filed: May 25, 2005

(65) Prior Publication Data

US 2006/0271547 A1   Nov. 30, 2006

(51) Int. Cl.
*G06F 12/00* (2006.01)
*G06F 11/00* (2006.01)

(52) U.S. Cl. ............................ 711/114; 711/170; 714/6

(58) Field of Classification Search ................... None
See application file for complete search history.

(56) References Cited

U.S. PATENT DOCUMENTS 5,583,995 A * 12/1996 Gardner et al. ............ 709/219

* cited by examiner

*Primary Examiner*—Donald Sparks
*Assistant Examiner*—Shawn Gu
(74) *Attorney, Agent, or Firm*—Lee & Hayes, PLLC

(57) ABSTRACT

Cluster storage collection-based data management is described. In one aspect, and in a distributed system for storing data across a network to multiple data storage nodes, a bounded bandwidth available for data repair in the distributed system is determined. A specific number of stripes are then created on each data storage node of the multiple data storage nodes. The stripes are for placement and replication of data objects across respective ones of the data storage nodes. The specific number of stripes created on each data storage node is a function of the determined bounded data repair bandwidth.

20 Claims, 6 Drawing Sheets

CLUSTER STORAGE COLLECTION BASED DATA MANAGEMENT

BACKGROUND

Storage solutions using clustered data storage node, or "bricks", connected with a Local Area Network (LAN) are becoming an increasingly attractive alternative to generally more expensive Storage Area Network (SAN) solutions. A brick is essentially a stripped down computing device such as a personal computer (PC) with a processor, memory, network card, and a large disk for data storage. For these systems, providing strong data reliability is confronted with new challenges. One reason for this is because inexpensive commodity disks are typically more prone to permanent failures. Additionally, disk failures are far more frequent in large systems. To guard against permanent loss of data, replication is often employed. The theory is that if one or more replicas are lost due to disk failures, other replicas will still be available for use to regenerate new replicas and maintain the same level of reliability.

Replica placement refers to a strategy of placing replicas among participating bricks. Two widely used replica placement schemes are staggered sequential placement like in chained de-clustering, and totally random placement. Mirroring can be viewed as a degenerated special case of sequential placement. Replica placement can significantly affect the reliability of a system due to two factors. The first factor is repair speed. The greater the number of bricks 110 used to participate in a data repair process (subject to the available network bandwidth), the sooner that the reliability level will return. The second factor is sensitivity to multiple and concurrent failures. The greater the number of permutation choices that data placement generates, the more likely a random failure of several bricks 110 will wipe out one or more portions of the data permanently. These two factors are conflicting in nature. For instance, the random placement has very fast repair speed, but is prone to concurrent failures, whereas the sequential placement is precisely the opposite.

SUMMARY

Cluster storage collection-based data management is described. In one aspect, and in a distributed system for storing data across a network to multiple data storage nodes, a bounded bandwidth available for data repair in the distributed system is determined. A specific number of stripes (or collections) are then created on each data storage node of the multiple data storage nodes. The stripes are for placement and replication of data objects across respective ones of the data storage nodes. The specific number of stripes created on each data storage node is a function of the determined bounded data repair bandwidth

BRIEF DESCRIPTION OF THE DRAWINGS

In the Figures, the left-most digit of a component reference number identifies the particular Figure in which the component first appears.

FIG. 4 shows the effect of object size on reliability of a system under a same system scale.

FIG. 7 shows an exemplary contour plot of MTTDL with different brick bandwidth and stripe numbers.

DETAILED DESCRIPTION

Overview

Sequential data placement operations are relatively simple: a brick acts as the lead brick, and the k replicas are placed on the lead brick and its k−1 followers. This is called "chained de-clustering." With sequential placement, when a brick fails, the k neighboring bricks 110 on each side of the failed brick may participate in brick repair. The limited parallel repair degree leads to slow repair speed, which then negatively affects data reliability of the system as a whole. The restrictive nature of sequential data placement reduces the sensitivity to concurrent failures. If and only if k simultaneous failures occur on k consecutive bricks 110 in the ordered array, any object can be lost. This is unlikely when N is much larger than k. Thus, sequential placement has a low likelihood of data loss when concurrent failures occur, which improves data reliability.

In a random data placement scheme, replicas are placed randomly across N bricks. The main objective of this particular scheme is to improve the speed of data repair. With random placement, when a brick fails, the replicas on the failed brick might be found on many other bricks. Thus, many bricks 110 can typically participate in parallel in data repair operations. This results in faster data repair speed as compared to sequential data repair schemes. This is this scheme's main advantage over sequential placement in improving data reliability. However, crashing k random bricks 110 in the random placement scheme might also remove all replicas of one or more objects. In the extreme case when there is a large volume of objects in the system and therefore the actual placement choices have exhausted all possible combinations, any k crashes will result in data loss. High sensitivity to multiple and concurrent failures, therefore, is the drawback of the random placement scheme.

An Exemplary System

Although not required, cluster storage collection-based data management is described in the general context of computer-executable instructions (program modules) being executed by computing devices such as a general purpose computer and a mobile handheld device. Program modules generally include routines, programs, objects, components, data structures, etc., that perform particular tasks or implement particular abstract data types. While cluster storage collection-based data management is described in the foregoing context, acts and operations described hereinafter may also be implemented in hardware.

Figure 1:
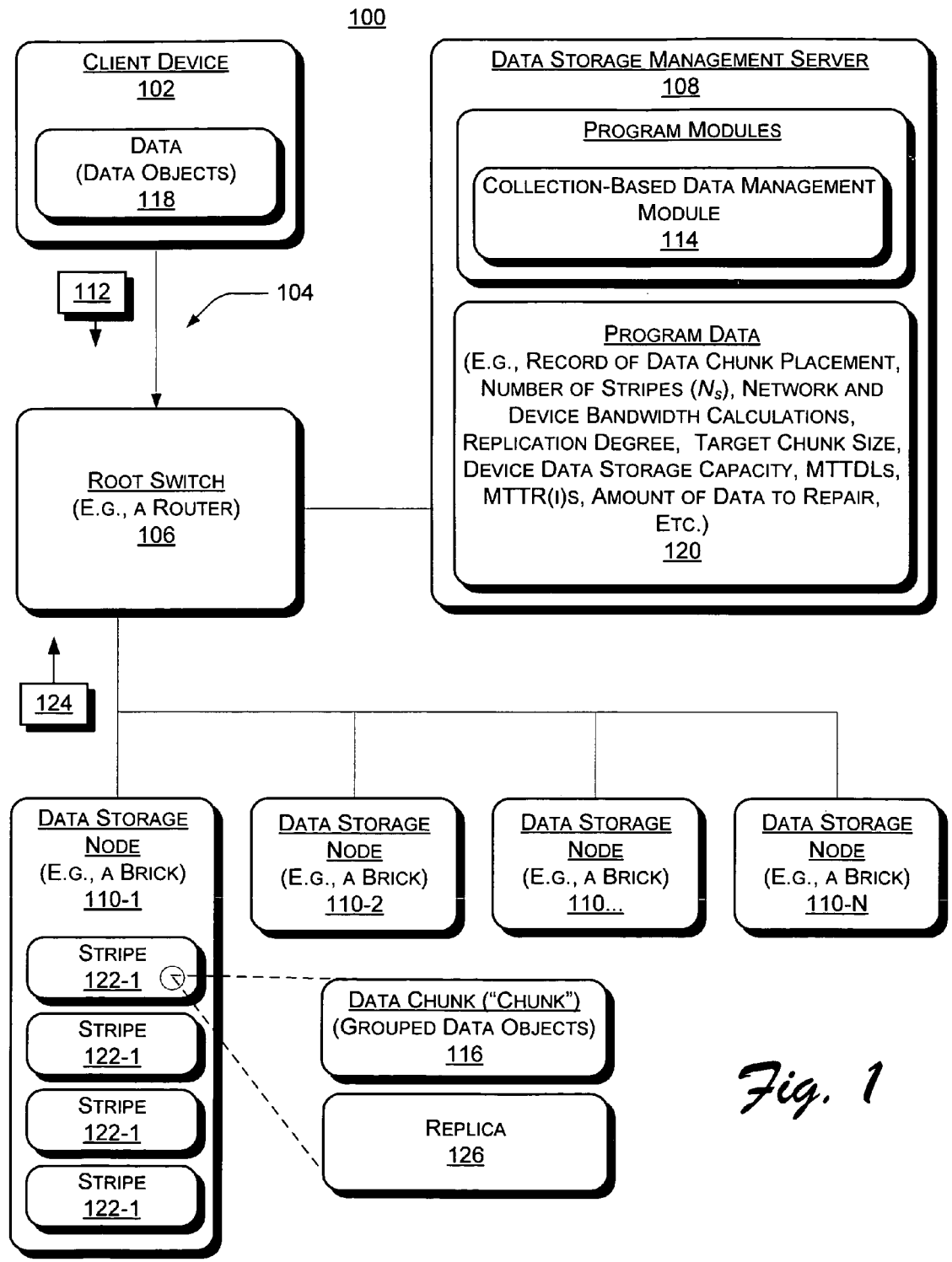
FIG. 1 illustrates an exemplary system for cluster storage collection-based data management.

FIG. 1 shows an exemplary system 100 for cluster storage collection-based data management. System 100 includes client computing device 102 coupled across network 104 to root switch (e.g., a router) 106, data storage management server 108 and data storage nodes ("bricks") 110 (e.g., nodes 110-1 through 110-N). Client device 102 is any type of computing device such as a personal computer, a laptop, a server, etc. Network 104 may include any combination of a local area network (LAN) and a general wide area network (WAN) communication environments, such as those which are commonplace in offices, enterprise-wide computer networks, intranets, and the Internet. Root switch 106 is a network device such as a router that connects client(s) 102, data storage management server 108 and all data nodes 110 together. All data access and data repair traffic goes through the root switch 106. Root switch 106 has bounded bandwidth for data repair, which is a parameter used by the collection-based data management implemented by the data storage management server 108 to determine the optimal chunk size, as described below. Each brick 110, for example, includes a processor, memory, network card, and computer-readable media such as a disk for data storage (e.g., a stripped down version of a personal computer).

Client device 102 sends data placement and access I/O requests 112 to the data storage management server 108. An input request 112 directs the data management server, and more particularly, collection-based data management program module 114, to distribute data chunks 116 associated with the input requests 112 across respective ones of bricks 110 using a random data placement scheme. Collection-based data management module 114 maintains a record of the bricks 110 that host respective ones of the data chunks 116. For purposes of exemplary illustration, data for distribution across bricks 110 are shown as data 118 (or data objects), and such a record is shown as a respective portion of "program data" 120. A data output (data access) request 112 directs Collection-based data management module 114 to access already stored data from corresponding bricks 110. Prior to processing such I/O requests 112, collection-based data management module 114 configures each brick 110 to implement cluster storage collection-based data management. To this end, and in one implementation, an administrator configures collection-based data management module 114 to implement the following described cluster storage collection-based data management configurations across bricks 110.

Collection-based data management module 114 configures each brick 110 with a number of stripes ($n_s$) 122 for storing data from client 102 using a replication data placement scheme. The particular number of stripes $n_s$ on each brick 110 is a substantially optimal number of stripes in view of the data repair bandwidth of system 100. System 100 data repair bandwidth is bounded and proportional to a backbone bandwidth ("B") of root switch 106, and inversely proportional to bandwidth ("b") of a brick 110. A guideline formula for $n_s$ is that $n_s$ is approximate or equal to B/b. Collection-based data management module 114 configures the size of each stripe 122 to accommodate, for each data input operation, a substantially optimally sized chunk 116 or grouped data objects 118, and a replica 126 of the chunk 116. The size of each chunk 116 ("chunk size") is calculated as a function of data storage capacity ("c") of brick 110 (e.g., disk capacity), bandwidth ("b") of brick 110, and backbone bandwidth ("B") of root switch 106. More particularly, the chunk size is calculated based on c·b/B.

Responsive to receiving data input requests 112, collection-based data management module 114 collects data objects 118 associated with one or more of the requests to create one or more data chunks ("chunks") 116. If one data object 118 has a target chunk size, then the one data object is a chunk 116, or unit for data placement. If the one data object is smaller than the target chunk size, then collection-based data management module 114 groups multiple such collected data objects to create a single chunk 116 of target chunk size. For purposes of exemplary illustration, the target chunk size is shown as a respective portion of "program data" 120. Further aspects of data chunks 116 are described below.

Collection-based data management module 114 delivers each chunk 116 to appropriate bricks 110 for data storage and replication across multiple bricks 110 using a random placement scheme. The collection-based data management module 114 organizes the objects 118 grouped within a single chunk 116 together using any standard indexing mechanisms, such as B-tree index widely used in file systems. With such an index, each individual object 118 can be located within the chunk 116. Responsive to receiving a file access request 112, collection-based data management module 114 communicates the access request to the corresponding bricks 110, which retrieves the data object using the index within the chunk, and delivers of corresponding data response(s) 124 to client device 102.

These and other aspects of system 100 are now described in greater detail in the following sections.

Reliability Metrics

Without loss of generality, replicas 126 are placed in stripe(s) 122 across an ordered array of N bricks 110. The number of replicas 126 of a chunk 116 is called the replication degree of the object, and it is denoted by k. Replication degree may differ from object to object, but for simplicity all objects have the same k. The responsibility of replica placement implemented by data management server 108 is to designate the particular bricks 110 on which the replicas are hosted. Each individual brick 110 may fail permanently and lose all replicas 126 stored on the brick. Brick failures, for purposes of discussion, are also called disk failures, since disk failures ultimately cause data loss. When a brick fails, to keep data reliability of system 100 at the same level, system 100 automatically regenerates the lost replicas at the remaining bricks 110. This replica regeneration process is called data repair.

Data Reliability Metric Mean Time to Data Loss (MTTDL)

Data reliability of system 100 is measured with the metric MTTDL. MTTDL indicates, after the system is loaded with data chunks 116, how long on average the system can sustain before it permanently loses a first chunk 116 in the system. Two factors affect data reliability. The first factor is the speed of data repair. Fast data repair means that lost replicas 126 are likely to be repaired before further brick failures. Thus, fast data repair reduces the time window in which concurrent brick failures occur, which may destroy all replicas of some object. The second data reliability factor is the likelihood of data loss when concurrent failures of bricks 110 occur. When k random bricks 110 fail concurrently in system 100, the likelihood that some chunk 116 whose k replicas 126 are located on the k failed bricks 110 depends on the placement scheme used, as we will discuss shortly.

In general, the more likely that the occurrence of concurrent brick failures will destroy all replicas of an object, the less reliable the system.

An Exemplary Analytical Framework

An exemplary analytical framework to analyze system 100 data reliability is now described. This analysis is subsequently used to determine the substantially optimal number of stripes 122 to place on a brick 110 and stripe size (and therefore, chunk 116 and replica 126 size). The framework derives MTTDL from system parameters such as bounded root switch 106 bandwidth available for data repair. (This framework can be applied to different object placement schemes). More particularly, system 100 has N bricks 110 and the replication degrees of all chunks 116 are k. The average amount of data stored on each brick 110 is c. Space is available on each brick 110 for data repair. Brick failures follow an exponential distribution with MTTF (mean time to failure) as its mean. One assumption is that each brick 110 fails independently. Another consideration is a model for correlated brick failures. Transient failures of bricks 110 that only affect data availability but not affect data loss are not considered. When a brick 110 fails, a new brick 110 is added into system 100 to keep the system scale at N.

All bricks 110 are connected in network 104 via root switch 106. The network 104 provides certain bandwidth for data repair traffic, the bound of which is given by B, which is called the backbone bandwidth. In this implementation, the backbone bandwidth is viewed as a certain percentage of the bandwidth of root switch 106 that is allowed for data repair traffic. This is because in many topologies, substantially all data repair traffic goes through the root switch.

$MTTDL_{obj}$

To conduct the analysis for MTTDL, an intermediate metric $MTTDL_{obj}$ is utilized. $MTTDL_{obj}$ is the mean time to data loss for an arbitrary chunk 116. $MTTDL_{obj}$ measures the data reliability of an individual object stored in system 100. If the system contains m chunks 116, and these m objects have independent data loss distributions, then $MTTDL=MTTDL_{obj}/m$. This is because each object has a data loss rate of $1/MTTDL_{obj}$, and when considered together in a system, the total data loss rate is $m/MTTDL_{obj}$. This is because individual data loss behaviors of this example are independent.

When chunk replicas 126 are placed in system 100, data loss behaviors depend on the failures of bricks 110, and thus may not be independent of each other. In particular, if the replicas 126 of two chunks 116 are co-located at the same set of bricks 110, data loss behaviors are perfectly correlated. In this case, the two objects are considered as one object, instead of two independent objects. For this reason, only objects whose replica placements are different are considered. Let m be the total number of different replica placement combination under a placement scheme. Accordingly:

$$MTTDL=MTTDL_{obj}/m. \quad (1).$$

This formula is an approximation. This is because different objects may have some but not all their replicas co-located on the same set of bricks 110 and thus their data loss behaviors are correlated. However, such co-locations are dictated by the replication degree k. Thus, when the system scale N is much larger than the replication degree k, the correlated data loss of objects caused by partial co-locations can be ignored. For sequential placement, this approximation is compared with an accurate analysis. The results show that this approximation substantially matches the accurate analysis.

In a system with N bricks 110, m can be as large as C(N,k). C(x,y) denotes the total number of combinations of picking y chunks 116 from x chunks 116.

An Exemplary Markov Chain Model

Figure 2:
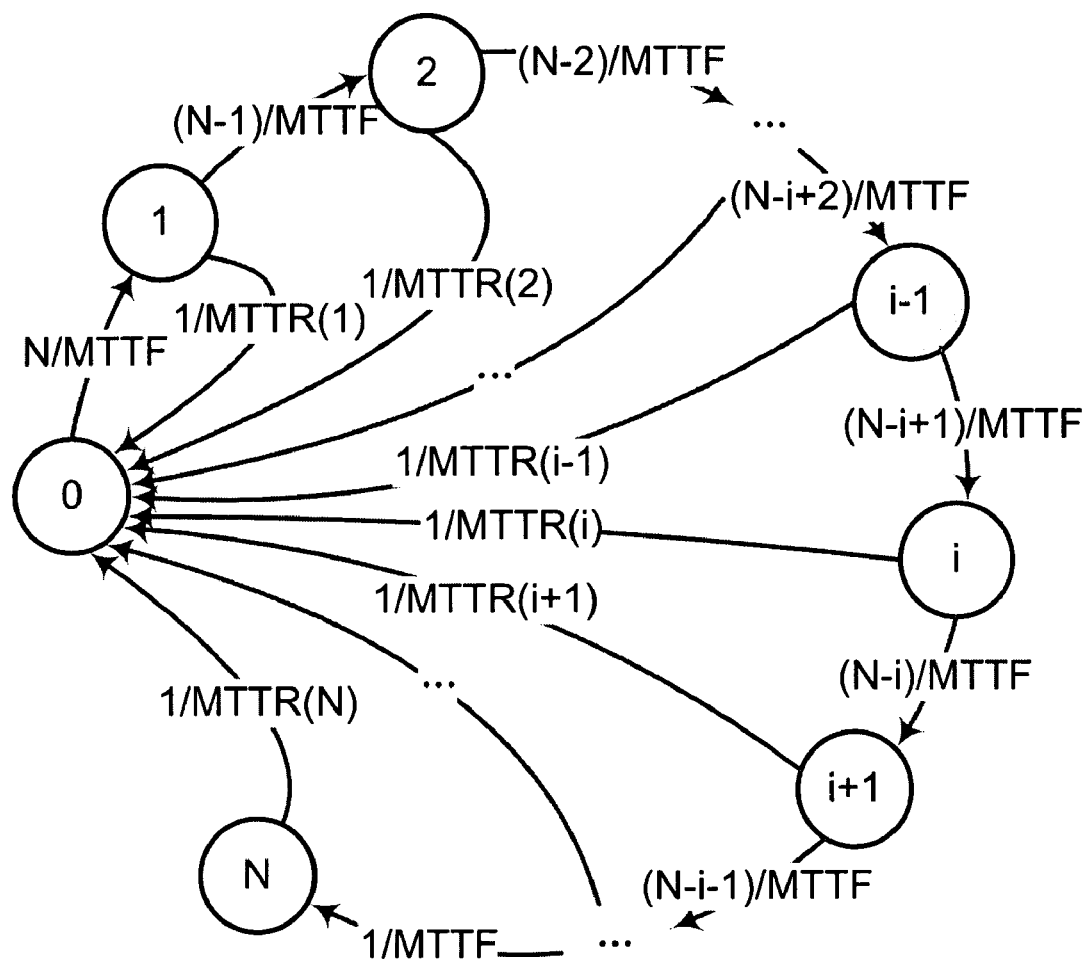
FIG. 2 shows an exemplary Markov model for system reliability analysis.

FIG. 2 shows an exemplary Markov model for reliability analysis. The Markov model is used to analyze $MTTDL_{obj}$, and thereby, model evolution of system 100 with brick 110 failures and data repair. In the model, state i represents the state of the system where exactly i bricks 110 have failed, and the lost replicas 126 on the failed bricks 110 have not been completely repaired. The arcs in the figure represent the transitions between different states in the system.

From state i to i+1, one more brick failures occur, which could also occur on any of the N−i remaining bricks 110. Thus, and since the brick failures are independent, the rate of transition is (N−i)/MTTF. Transition from state i to state 0 represents that data repair is completed before a new brick 110 fails. Let MTTR(i) denote the mean time to repair all the failed replicas in state i. Thus the transition rate from state i to state 0 is 1/MTTR(i). MTTR(i) depends on the size of data to be repaired and the available bandwidth for repair. In the next section, we will show that random placement is advantageous as compared to sequential placement because random placement has a much smaller MTTR(i).

Deriving $MTTDL_{obj}$

MTBF(i) is the mean time between two consecutive occurrences of state i in the Markov model. Let L(i) be the probability that the object (chunk 116) is lost when i bricks 110 fail concurrently. Let P(i) be the probability of the system staying in state i. The following formula shows that $MTTDL_{obj}$ is calculated from the harmonic sum of mean time between data loss in each individual state i.

$$MTTDL_{obj} = \left[\sum_{i=k}^{N} MTBF(i)^{-1} \cdot L(i)\right]^{-1}.$$

Probability L(i) is derived from the following combinatorial calculation:

$$L(i)=C(i,k)/C(N,k).$$

The derivation of MTBF(i) is as follows. A compressed timeline is considered. The timeline has time segments when the system is in state i−1. In the compressed timeline, when any of the remaining (N−i+1) bricks 110 fails, the i-th failure occurs, and the mean time between two consecutive events of the i-th failures is MTTF/(N−i+1). Since the system is in state i−1 with probability P(i−1), the compressed timeline compresses time period from the original timeline with the ratio P(i−1). Therefore, in the original timeline, there is:

$$MTBF(i) = \frac{MTTF}{(N-i+1) \cdot P(i-1)}.$$

P(i) is computed from the following balance equation for the Markov model:

$$\begin{cases} \frac{P(i)}{P(i-1)} = \frac{(N-i+1)/MTTF}{(N-i)/MTTF + 1/MTTR(i)}, \text{ for all } i \geq 1. \\ \sum P(i) = 1 \end{cases}$$

Exemplary Derivation of MTTR(i)

MTTR(i) depends on both an amount of data to repair and repair bandwidth. Let D(i) and rb(i) be the amount of data to repair and the repair bandwidth in state i, respectively. Let T be the time to detect a failure in the system 100. In this implementation, and for purposes of exemplary illustration, a time T of 10 seconds is used for analysis. Then $$MTTR(i)=T+D(i)/rb(i). \quad (2).$$

The amount of data to repair D(i) depends on c (the amount of data in the last failed brick 110) and the amount of the un-repaired data left from the previous state ur(i).

$$D(i)=ur(i)+c.$$

The amount of un-repaired data left from the previous state ur(i) depends on (a) the total amount of the previous state's data to be repaired D(i−1), (b) the mean time to the next failure in the previous state mf(i−1), and (c) the previous state's repair bandwidth rb(i−1).

$$ur(i) = \begin{cases} D(i-1) - rb(i-1) \cdot mf(i-1) & \text{(when } D(i-1) > rb(i-1) \cdot mf(i-1)) \\ 0 & \text{(when } D(i-1) \leq rb(i-1) \cdot mf(i-1)). \end{cases}$$

In state i−1, the mean time to next failure mf(i−1) is MTTF/(N−i+1). Thus, $$D(i)=\max [D(i-1)-rb(i-1) \cdot MTTF/(N-i+1),0]+c.$$

Once rb(i) is known, D(i) is iteratively calculated using the above formula. The repair bandwidth rb(i) at state i varies with different placement schemes. In the next section such a repair bandwidth value is determined for both sequential placement and random placement.

Comparison of Sequential Placement with Random Placement

The above description provides an exemplary general framework to analyze data reliability of distributed brick storage system 100 with a bounded backbone repair bandwidth. Two terms of the analysis: (a) m, which is the possible replica placement combinations in the system; and (b) rb(i), which is a repair bandwidth at state I, are now calculated for both sequential placement and random placement. The larger the m, the worse the data reliability, while the larger the rb(i), the faster data repair can be completed and thus the better the data reliability. These two terms vary among different placement schemes.

Sequential Placement

In sequential placement, replicas are restricted to be placed on k consecutive bricks in an ordered array of bricks. This restriction leads to only N possible placement combinations, i.e. m=N, which benefits the reliability of the system. To calculate the repair bandwidth, let b be the maximum bandwidth of a brick. When one brick fails, the replicas on the failed brick are regenerated on the k consecutive bricks after the failed brick. So repair bandwidth could reach b·k. However, among these k bricks, at least one brick will also be a source for data repair, bringing the effective bandwidth only to one-half, i.e. b·k/2. When i concurrent failures occur, this gives b·k·i/2 (a situation when multiple failures are within the range of k is not considered). Also, the maximum repair bandwidth cannot exceed the backbone bandwidth B. In view of the above, rb(i)=min(B, b·k·i/2).

Random Placement

In random placement, replicas 126 are scattered randomly among the bricks 110 in system 100. When one brick fails, other bricks 110 contain the replicas that are lost on the failed brick. So many replicas can act as the source of data repair, vastly bringing up the degree of parallel repair and hence the repair bandwidth. Quantitatively, the repair bandwidth of the random placement scheme is given by rb(i)=min(B, b(N−i)/2). The term b(N−i)/2 means that when a brick fails, half of the remaining bricks 110 contain the replicas need to be generated, and they copy the replicas to the other half of the bricks 110, which is a good-case scenario but can be closely approximated.

The possible placement combinations m depend on the number of stored data objects, which is determined by the size of the data object in the system. Let s denote the average size of an object in the system. When the system has N bricks 110 with the amount of data stored on each brick being c and the replication degree of k, the number of objects in the system is N·c/(k·s). Thus, the possible placement combination m is given by min(C(N,k),N·c/(k·s)). This value could be much larger than N, the corresponding value of m in sequential placement, especially when the object size is small. This is the major drawback of the random placement scheme that significantly reduces the reliability of a conventional system.

Table 1 lists the results of these determinations and calculations, where s denotes the average object size, and b denotes bandwidth of a brick.

TABLE 1

DIFFERENTIATING QUANTITIES FOR SEQUENTIAL AND RANDOM DATA PLACEMENT

|  | m | rb(i) |
|---|---|---|
| Sequential | N | min(B, b · k · i/2) |
| Random | min(C(N, k), (N · c)/(k · s)) | min(B, b · (N − i)/2) |

Referring to Table 1, and comparing rb(i) of the two schemes, it is clear that the repair bandwidth of the random placement is much higher than the repair bandwidth of sequential placement, for relatively small i's that are mostly relevant to the data reliability.

Comparison

Figure 3:
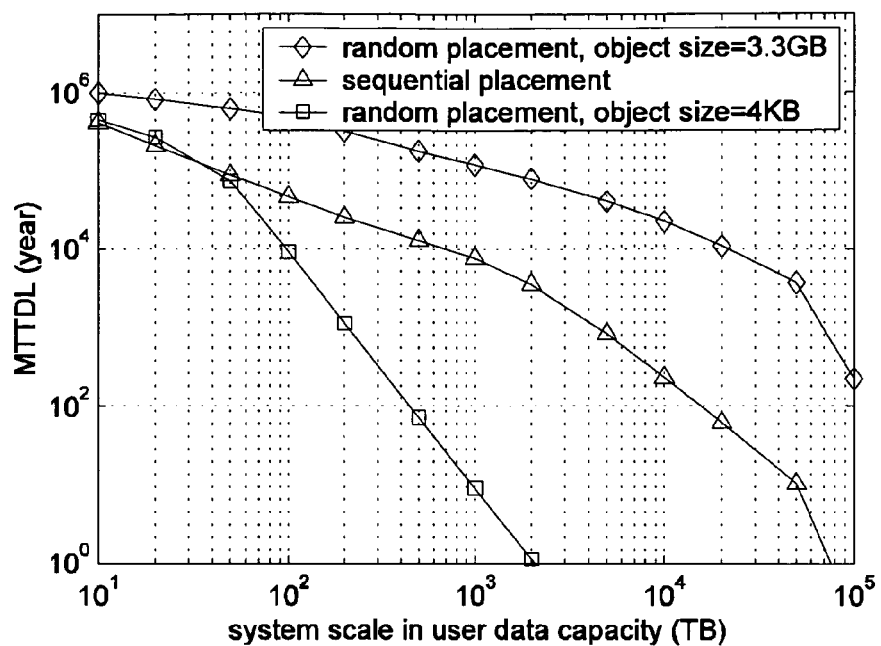
FIG. 3 shows exemplary Mean Time to Data Loss (MTTDL) of a system with sequential data placement and random data placement schemes.

FIG. 3 shows exemplary MTTDL of a system as compared to system scale, with sequential placement and random placement. The user data capacity of the system is c·N/k. In view of this, and in this example, exemplary values are as follows: MTTF=1000 days, k=3, B=3 GB/s, b=20 MB/s, c=500 GB. The object size of 4 KB in random placement is when m reaches C(N,k). Referring to Table 1 and FIG. 3, Table 1 shows that MTTDL is computed in view of a given set of system configuration parameters. FIG. 3 shows exemplary analytical sequential placement and random placement comparison results. Referring to FIG. 3, after the system scale passes a certain point, all schemes essentially stop working: bricks fail so frequently that, with the network bandwidth staying the same, data repair cannot keep up with the brick failures, and the data reliability drops significantly. This means that given a certain backbone bandwidth, the system has a scalability limit. Additionally, given the same user capacity, random placement is sensitive to object sizes. The sequential placement scheme is better than random placement for small object size but is worse than that with large object size.

Figure 4:
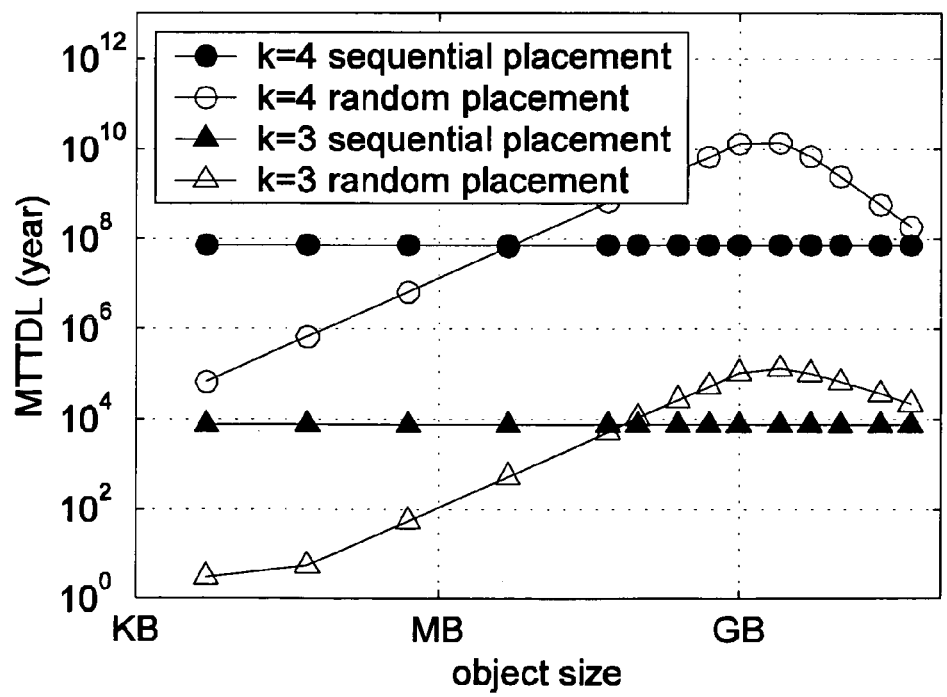
FIG. 4 shows an exemplary comparison of sequential data placement and random data placement with varying object size. More particularly.

FIG. 4 shows an exemplary comparison of sequential placement with random placement with varying object size. In this example, user capacity of the system is set to 1 PB=1000 TB. Other system parameters are the same as indicated above with respect to FIG. 3. Referring to FIG. 4, the effect of object size on the reliability of the system under the same system scale is illustrated. In sequential placement, reliability is not affected by object size, because data loss is determined only by the concurrent failures of k consecutive bricks. However, in random placement small object size means a large number of objects, and thus they are more likely to exhaust the possible placement combinations, giving low reliability. When the object size is large, the possible combinations are small, and the benefit of parallel data repair wins over and thus the data reliability is better than sequential placement. But if the object size continues to grow larger, the benefit of parallel repair diminishes and the reliability in random placement returns to the same level as sequential placement.

FIG. 4 shows exemplary results of replication degree of 3 versus 4. In this example, replication degree of 4 provides close to four orders of magnitude better reliability. In general replication degree of 3 or 4 provides enough reliability for most systems.

Exemplary Stripe Placement for Substantially Optimal Reliability

Referring to FIG. 1, system 100 provides substantially optimal reliability with the random placement scheme for chunks 116 of a substantially optimal target size. System 100 extends this reliability to data objects that are less than the target size. To this end, collection-based data management module 114 of FIG. 1 collects small data objects from input requests 112 and groups them together into a chunk 116 of the target size. Essentially, this enables system 100 to treat small data objects with less than optimal sizes like a large object (chunk 116) of the optimal size for placement and repair. This significantly reduces possible data placement combinations, while maintaining good data repair speeds.

More particularly, collection-based data management module 114 groups small data objects 118 from input requests 112 to form a chunk 116, which is the unit for placement and repair in system 100. The sizes of the chunks 116 are the same. The k replicated chunks 126 of the same set of objects 122 form a set called a stripe 122. A stripe migrates among the bricks 110 in the system with brick failures and data repairs. Let stripe number $n_s$ be the number of different stripes that can be hosted by one brick 110. Stripe number determines the degree of parallel data repair. When a brick 110 hosting $n_s$ stripes fails, $n_s$ different chunks 116 need to be repaired and thus the parallel repair degree is at most $n_s$. The value of $n_s$ is related to the backbone bandwidth B such that the backbone bandwidth is substantially fully utilized.

System 100 implements random placement of chunks 116 and randomly selecting chunk repair sources 110 and destinations 110 to manage the stripes 122. This is relatively simple to do in a distributed environment to allow the parallel repair degree to be close to $n_s$ in spite of brick 110 failures and repairs. In addition to managing random placement of chunks, stripe placement also manages the grouping of data objects 118 into chunks 116 for placement in respective ones of the stripes 122. The grouping guarantees that when a new chunk 116 is added into a stripe 122, every chunk 116 within the stripe has enough space to accommodate one corresponding replica 126. To do so, when the stripe 122 is first created, every chunk 116 in the stripe pre-allocates enough space for the entire chunk (e.g., the chunk and the replica).

Determining a Substantially Optimal Number of Stripes per Brick

Figure 5:
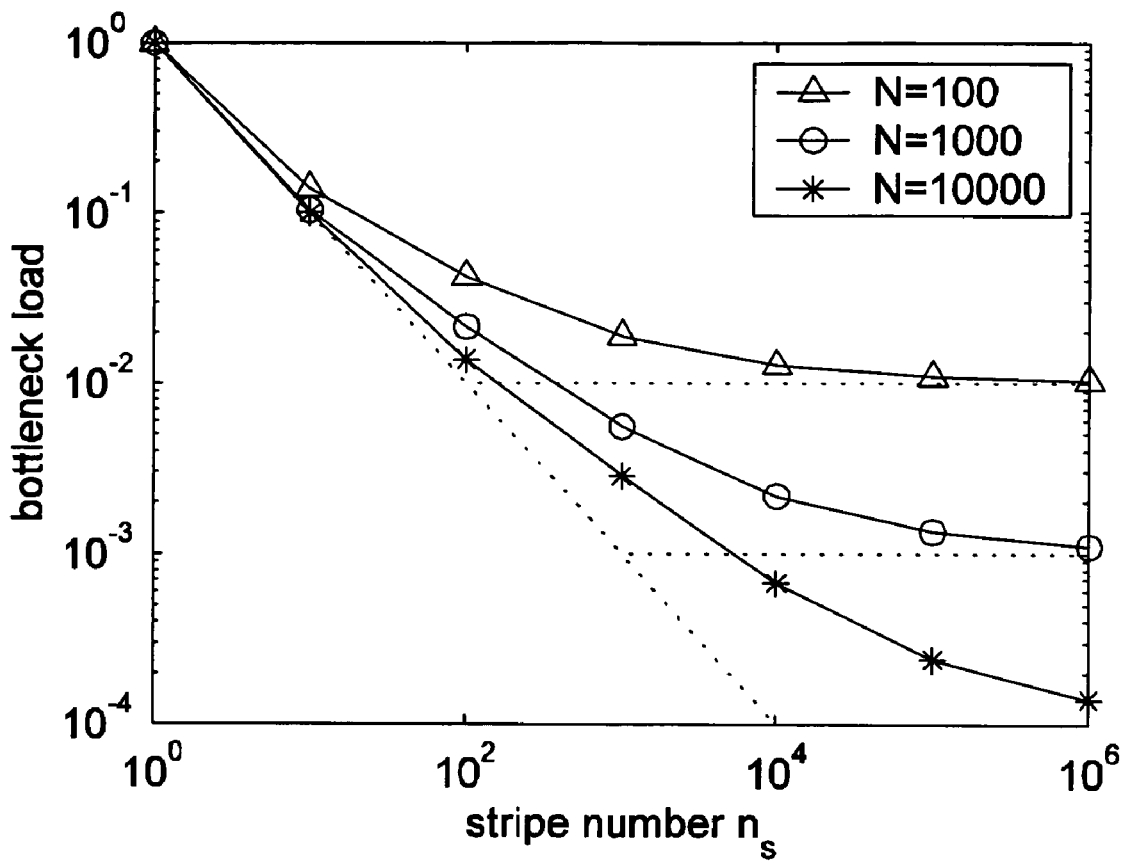
FIG. 5 shows exemplary bottleneck data repair loads in view of stripe number.

FIG. 5 shows exemplary bottleneck data repair loads in view of stripe number. We now describe how an optimal $n_s$, such that reliability of system 100 is substantially the highest, is determined. To this end, the described analytical framework is used to calculate the reliability of system 100 for different $n_s$. In view of these various reliabilities, an $n_s$ that provides system 100 with the optimal reliability is identified.

For the number of possible placement combinations, we have $m=n_s \cdot N/k$, since each brick 110 hosts $n_s$ stripes 122 and each stripe is hosted by k bricks. Next, for the repair bandwidth, ideally all $n_s$ chunks 116 on a failed brick will be repaired by $n_s$ different pairs of sources 102 and destinations 102, in which case the repair bandwidth is $rb(i)=\min(B, b \cdot n_s)$. However, with random placement of chunks 116 the repair load may not be even: Some bricks 110 may have more chunks to repair than others. The bottleneck brick 110 is the one with the highest repair load. Let H be the number of stripes 122 to be repaired in the bottleneck brick 110. $H/n_s$ represents the bottleneck load, which is denoted as $l_b$. A Monte-Carlo simulation is used to calculate $l_b$, and the result is shown in FIG. 5. The result is that when $n_s$ is close to N, the bottleneck load could be one order of magnitude larger than $1/n_s$; the load in the ideal case.

Data repair time is based on the bottleneck load, which is $c \cdot l_b/b$, where c is the amount of data (chunks and replicas) in a brick 110, and b is the brick bandwidth. Combining this with the repair time calculation in the framework (formula (2)), provides the following repair time formula for the stripe 122 placement scheme:

$$MTTR(i)=T+\max\,[D(i)/\min(B,b \cdot n_s),\ c \cdot l_b/b]$$

Plugging in the above formula in the analytical framework, together with $m=n_s \cdot N/k$, the reliability of the stripe placement scheme in system 100 is determined.

Figure 6:
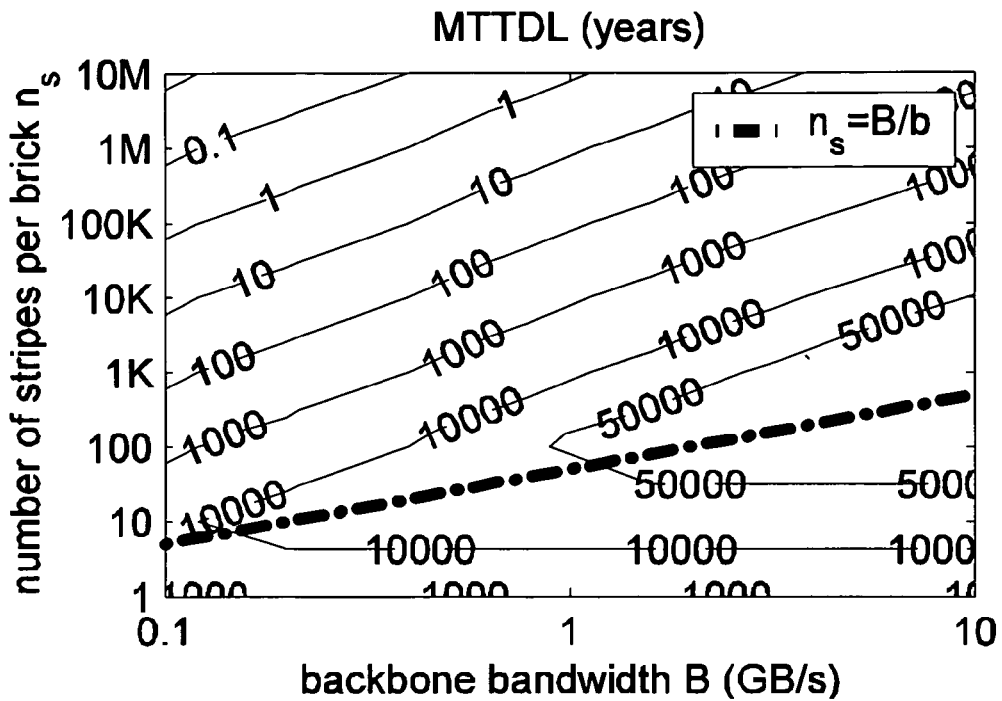
FIG. 6 shows exemplary analysis results for determining a substantially optimal number of stripes to implement on each data storage node.
Figure 7:
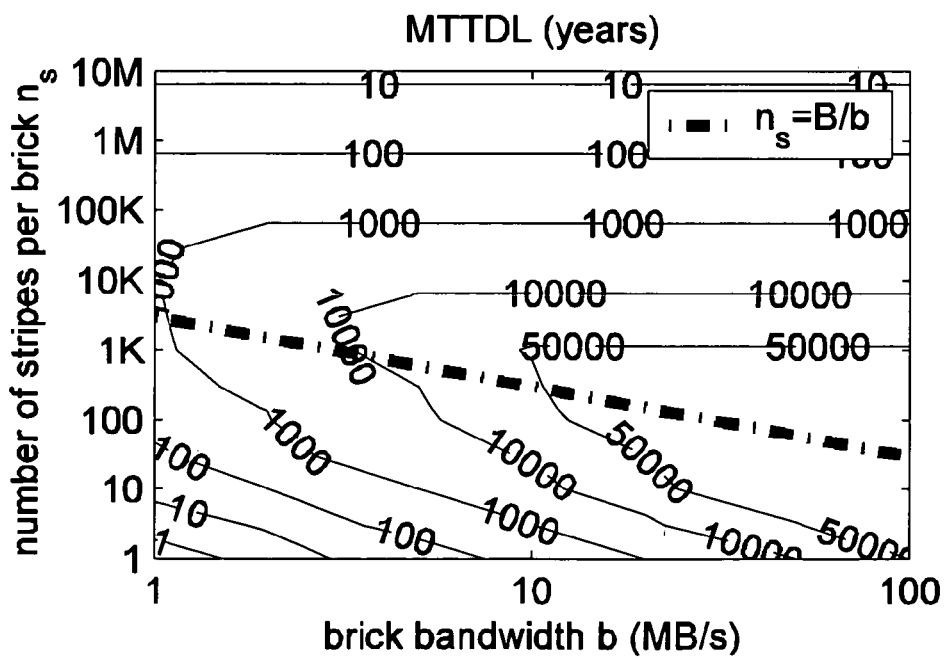
FIG. 7 shows exemplary analysis results for determining a substantially optimal number of stripes per data storage node. More particularly.

FIGS. 6 and 7 show exemplary result of the analysis to determine a substantially optimal number of stripes per brick (brick) 102. More particularly, FIG. 6 shows an exemplary contour plot of MTTDL with different network bandwidth and stripe numbers. As network bandwidth increases with the stripe number fixed (walking horizontally through the contour), MTTDL increases because repair is faster due to repair bandwidth increase. As stripe number increases with a fixed backbone bandwidth (walking up vertically through the contour), MTTDL initially increases, but then decreases, indicating that there is an optimal stripe number. The optimal stripe number (the ridge of the contour) increases when the network bandwidth increases, because more network bandwidth allows larger parallel repair degree, which means larger number of stripes. The dashed line is calculated from the suggested optimal stripe number formula and is close the optimal stripe number. Accordingly, for each backbone bandwidth value, there is an optimal stripe number $n_s$ to give the best MTTDL. Referring to FIG. 6, note that the best MTTDL values are located along the ridge in the contour. Along this ridge, the stripe number $n_s$ increases proportionally to the backbone bandwidth FIG. 7 shows an exemplary contour plot of MTTDL with different brick bandwidth and stripe numbers. As shown, when disk bandwidth increases with stripe number fixed (walking horizontally through the contour), MTTDL increases because repair is faster due to disk bandwidth increase. It also shows that when the stripe number increases with a fixed backbone bandwidth (walking up vertically through the contour), MTTDL increases initially but then decreases, indicating that there is an optimal stripe number. The optimal stripe number (the ridge of the contour) decreases when disk bandwidth increases, because more disk bandwidth with fixed network bandwidth means smaller parallel repair degree and thus smaller number of stripes. The dashed line is calculated from the suggested optimal stripe number formula and is close the optimal stripe number.

FIG. 7 also shows optimal MTTDL values on the ridge of the plot. However, in this case, the optimal stripe number $n_s$ is reverse-proportional to the brick bandwidth. The optimal stripe number is not a function of scale of system 100. Accordingly, optimal stripe number $n_s$ is proportional to the backbone bandwidth B, reverse-proportional to the brick bandwidth b, and not related to the system scale N. Thus, the optimal stripe number $n_s$ is B/b. Referring to FIGS. 6 and 7, the dash-dotted lines correspond to the stripe numbers with B/b.

In this implementation, formula $n_s$=B/b is a "guideline" formula. FIG. 7 shows that a reasonable range around the optimal stripe number (e.g. within an order of magnitude change) still permits good reliability that is close to the optimal MTTDL. This means that the guideline of B/b is reasonably robust and may still be applicable even when the rootswitch 106 or brick disks are upgraded over time. Given a set of system parameters, one can use the described analytical framework and numerical method to find the true optimal $n_s$. The result may be little different from B/b. However, $n_s$=B/b provides near-optimal system reliability. In view of this, the optimal chunk size (target object size) is c·b/B as a function of disk bandwidth, backbone bandwidth and disk capacity.

When $n_s$ pairs of sources 110 and destinations 110 participate in data repair in parallel, and each pair may have maximum bandwidth of b. If $n_s$=B/b, then the overall repair bandwidth is $n_s$b=B, which means the repair substantially exactly saturates the available network 104 bandwidth. This is the best that one can expect. Therefore $n_s$=B/b provides near optimal reliability. With $n_s$=B/b, stripe placement provides much better reliability than sequential placement and random placement. As a numerical example, with an exemplary setting of B=3 GB/s, b=20 MB/s, k=3, c=500 GB, and total user capacity of 1 PB, optimal stripe placement achieves an MTTDL of $9.41 \cdot 10^4$ years. This does not vary with object size. In contrast, the sequential placement has an MTTDL of $7.66 \cdot 10^3$ years. The random placement has MTTDL values worse than sequential placement when the average object size is less than a few tens of megabytes. Its MTTDL is only getting close to the optimal value when the average object size is in the gigabyte range, as shown in FIG. 4.

An Exemplary Procedure

Figure 8:
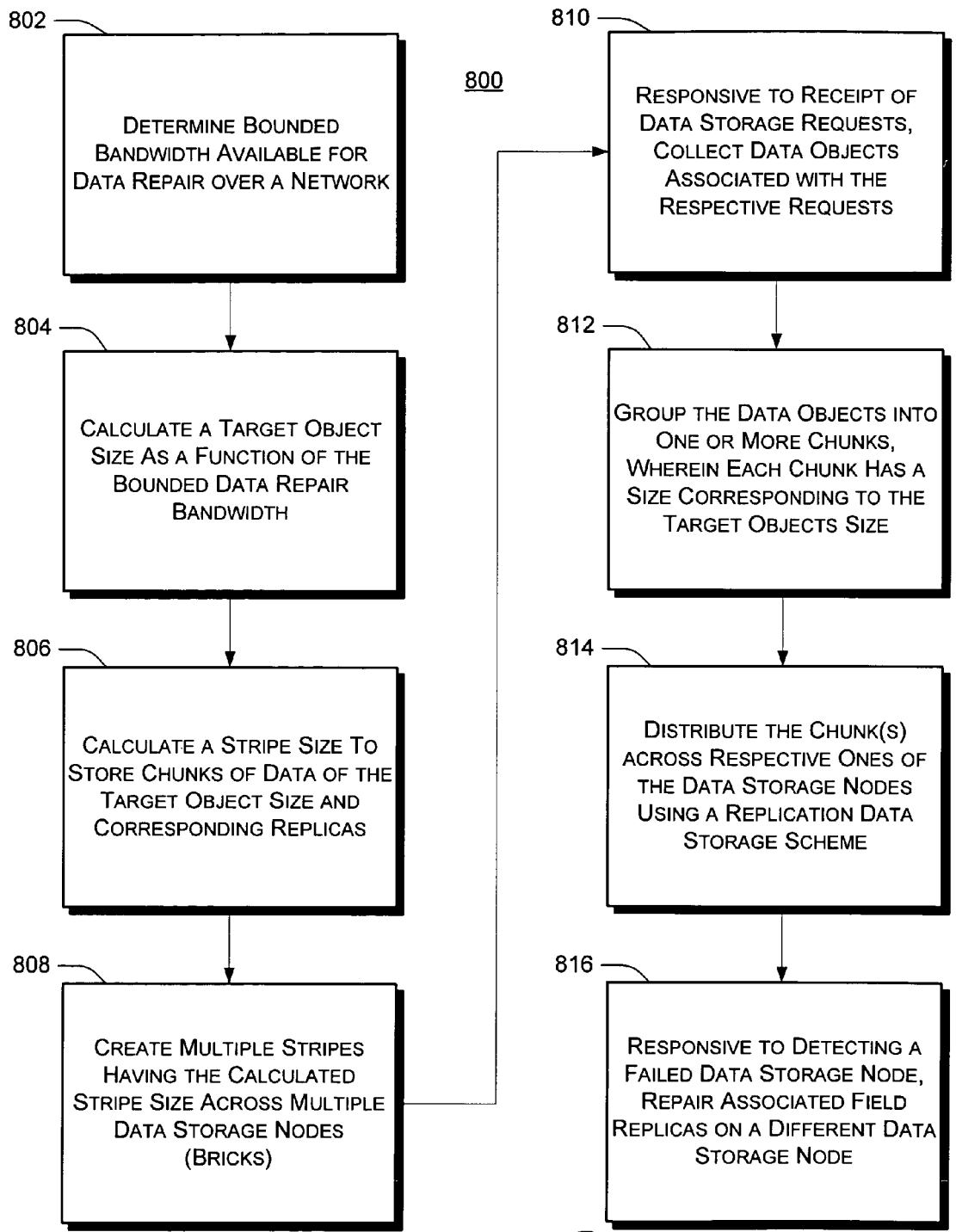
FIG. 8 shows an exemplary procedure for cluster collection-based data management.

FIG. 8 shows an exemplary procedure 800 for cluster collection-based data management. For purposes of discussion, the operations of FIG. 8 are described in reference to components of FIG. 1. In the Figures, the left-most digit of a component reference number identifies the particular Figure in which the component first appears. At block 802, a bounded bandwidth available for data repair over the network 104 is determined. This determination is made in view of a backbone bandwidth ("B") of network 104 and a bandwidth ("b") of a brick 110. At block 804, a stripe size is calculated such that each stripe 122 will accommodate, for each new data chunk 116 added to the stripe, the data chunk and a replica of 126 the data chunk. The data chunk is a function of a determined target chunk size, which in turn is a function of bandwidth of a disk (or other computer-readable medium) for storing data on a brick 110, data storage capacity of the disk, and bandwidth of root switch 106.

At block 806, collection-based data management module 114 creates multiple stripes 122 across each of the bricks 110. The number of stripes $n_s$ placed on each node 110 is a function of bandwidth of the network 104 and bandwidth of a single brick 110. At block 808, responsive to receipt of data storage requests (i.e., input requests 112) from client 102, collection-based data management module 114 collects data objects 118 associated with the respective requests. At block 810, collection-based data management module 114 groups one or more data objects into a chunk 116 with a size corresponding to the target chunk size. The actual number of bytes in the chunk may or may not represent an exact byte number equaling the target chunk size. However, the number of bytes will be as close as possible to the target chunk size as a function of the particular data object sizes used to create the chunk 116.

At block 812, collection-based data management module 114 distributes the chunk 116 and corresponding replica(s) 126 across respective ones of the bricks 110 using a replication data storage scheme. At block 816, and responsive to a detecting a failed brick 110, a brick 110 is randomly selected to repair associated failed replicas 126 on a different brick 110.

CONCLUSION

Although cluster storage collection-based data management has been described in language specific to structural features and/or methodological operations or actions, it is understood that the implementations defined in the appended claims are not necessarily limited to the specific features or actions described. Rather, the specific features and operations are disclosed as exemplary forms of implementing the claimed subject matter.

The invention claimed is:

1. In a distributed system for storing data across a network to multiple data storage nodes, a method comprising:
   determining a bounded bandwidth available for data repair in the distributed system;
   creating a specific number of stripes on each data storage node of the multiple data storage nodes, the stripes for placement and replication of data objects across respective ones of the data storage nodes, the specific number of stripes on each data storage node being a function of the bounded bandwidth; and
   wherein the creating further comprises:
      (a) calculating a target chunk size based on a replication degree such that data reliability of storing data across the multiple data storage nodes using a random data placement scheme is optimized, the calculating comprising analyzing data reliability of the distributed system in view of the bounded bandwidth by estimating a mean time to data loss (MTTDL) for an object ($MTTDL_{obj}$) of multiple objects as a function of a harmonic sum of MTTDL in each state i of multiple states i, the distributed system comprising the multiple objects, each state i representing a state of the distributed system when i data storage nodes fail and lost replicas on the i data storage nodes have not been repaired; and
      (b) allocating disk storage space on each node as a function of the target chunk size.

2. The method of claim 1, wherein the bounded bandwidth is a function of bandwidth of a network and bandwidth of a data storage node of the data storage nodes.

3. The method of claim 1, wherein the target chunk size is based on bandwidth of a computer-readable medium for storing data on a data storage node of the data storage nodes, storage capacity of the computer-readable medium, and network bandwidth.

4. The method of claim 1, wherein the analyzing further comprises estimating a mean time to repair (MTTR) all failed replicas in a state i (MTTR(i)) of the multiple states i, the MTTR(i) being a function of an amount of data to be repaired in the state i and available bandwidth for repair in the state i.

5. The method of claim 4, wherein the amount of data to be repaired in the state i is based on an amount of data in a last failed computing device of the i data storage nodes, and an amount of un-repaired data left on the last failed computing device from a previous state i.

6. The method of claim 1, wherein the method further comprises randomly placing a single chunk of collected data objects on a randomly selected data storage node, the single chunk having been generated to correspond to the target chunk size, the single chunk being a unit for placement and repair.

7. The method of claim 1, wherein the method further comprises:
grouping two or more data objects that are smaller than a target chunk size into a unit for placement and repair, and wherein the target chunk size is further based on bounded network bandwidth and brick bandwidth such that reliability of storing data across the multiple data storage nodes using a random data placement scheme is optimized; and
randomly placing the unit for placement and repair on a randomly selected data storage node.

8. The method of claim 1, further comprising:
collecting multiple data objects from data storage requests;
determining that collected ones of the multiple data objects meet a collective target chunk size criteria;
responsive to the determining, grouping the multiple data objects into a single chunk;
randomly selecting a data storage node and a corresponding stripe of the stripes for data placement; and
storing the single chunk of collected data objects onto the stripe using a replication data storage scheme.

9. In a distributed system for storing data across a network to multiple data storage nodes, a computing device comprising:
a processor coupled to a memory, the memory comprising computer-program instructions executable by the processor for performing operations including:
determining a bounded bandwidth available for data repair in the distributed system;
creating a specific number of stripes on each data storage node of the multiple data storage nodes, the stripes for placement and replication of data objects across respective ones of the data storage nodes, the specific number of stripes on each data storage node being a function of the bounded bandwidth; and
wherein the creating further comprises:
(a) calculating a target chunk size based on a replication degree such that data reliability of storing data across the multiple data storage nodes using a random data placement scheme is optimized, the calculating comprising analyzing data reliability of the distributed system in view of the bounded bandwidth by estimating a mean time to data loss (MTTDL) for an object (MTTDL$_{obj}$) of multiple objects as a function of a harmonic sum of MTTDL in each state i of multiple states i, the distributed system comprising the multiple objects, each state i representing a state of the distributed system when i data storage nodes fail and lost replicas on the i data storage nodes have not been repaired; and
(b) allocating disk storage space on each node as a function of the target chunk size.

10. The computing device of claim 9, wherein the bounded bandwidth is a function of bandwidth of a network and bandwidth of a data storage node of the data storage nodes.

11. The computing device of claim 9, wherein the target chunk size is based on bandwidth of a computer-readable medium for storing data on a data storage node of the data storage nodes, storage capacity of the computer-readable medium, and network bandwidth.

12. The computing device of claim 9, wherein the analyzing further comprises estimating a mean time to repair (MTTR) all failed replicas in a state i (MTTR(i)) of the multiple states i, the MTTR(i) being a function of an amount of data to be repaired in the state i and available bandwidth for repair in the state i.

13. The computing device of claim 12, wherein the amount of data to be repaired in the state i is based on an amount of data in a last failed computing device of the i data storage nodes, and an amount of un-repaired data left on the last failed computing device from a previous state i.

14. The computing device of claim 9, wherein the computer-program instructions further comprise instructions for randomly placing a single chunk of collected data objects on a randomly selected data storage node, the single chunk having been generated to correspond to the target chunk size, the single chunk being a unit for placement and repair.

15. The computing device of claim 9, wherein the computer-program instructions further comprise instructions for:
grouping two or more data objects that are smaller than a target chunk size into a unit for placement and repair, and wherein the target chunk size is further based on bounded network bandwidth and brick bandwidth such that reliability of storing data across the multiple data storage nodes using a random data placement scheme is optimized; and
randomly placing the unit for placement and repair on a randomly selected data storage node.

16. The computing device of claim 9, wherein the computer-program instructions further comprise instructions for:
collecting multiple data objects from data storage requests;
determining that collected ones of the multiple data objects meet a collective target chunk size criteria;
responsive to the determining, grouping the multiple data objects into a single chunk;
randomly selecting a data storage node and a corresponding stripe of the stripes for data placement; and
storing the single chunk of collected data objects onto the stripe using a replication data storage scheme.

17. In a distributed system for storing data across a network to multiple data storage nodes, one or more computer-readable media having encoded thereon computer-program instructions executable by a processor for performing operations comprising:
determining a bounded bandwidth available for data repair in the distributed system;
creating a specific number of stripes on each data storage node of the multiple data storage nodes, the stripes for placement and replication of data objects across respective ones of the data storage nodes, the specific number of stripes on each data storage node being a function of the bounded bandwidth; and wherein the creating further comprises:
(a) calculating a target chunk size based on a replication degree such that data reliability of storing data across the multiple data storage nodes using a random data placement scheme is optimized, the calculating comprising analyzing data reliability of the distributed system in view of the bounded bandwidth by estimating a mean time to data loss (MTTDL) for an object ($MTTDL_{obj}$) of multiple objects as a function of a harmonic sum of MTTDL in each state i of multiple states i, the distributed system comprising the multiple objects, each state i representing a state of the distributed system when i data storage nodes fail and lost replicas on the i data storage nodes have not been repaired; and
(b) allocating disk storage space on each node as a function of the target chunk size.

18. The one or more computer-readable media of claim 17, wherein the computer-program instructions further comprise instructions for randomly placing a single chunk of collected data objects on a randomly selected data storage node, the single chunk having been generated to correspond to the target chunk size, the single chunk being a unit for placement and repair.

19. The one or more computer-readable media of claim 17, wherein the analyzing further comprises estimating a mean time to repair (MTTR) all failed replicas in a state i (MTTR(i)) of the multiple states i, the MTTR(i) being a function of an amount of data to be repaired in the state i and available bandwidth for repair in the state i.

20. The one or more computer-readable media of claim 19, wherein the amount of data to be repaired in the state i is based on an amount of data in a last failed computing device of the i data storage nodes, and an amount of un-repaired data left on the last failed computing device from a previous state i.

* * * * *